A. DEWES.

HOLLOW HAND-CUTTER FOR LEATHER.

No. 6,857. Reissued Jan. 18, 1876.

Attest:

Frank C. Rumery

Clarence C. Stulting

Inventor:

Abedneyo Dewes

Marcus Hanaw

UNITED STATES PATENT OFFICE.

ABEDNEGO DEWES, OF HUDSON CITY, NEW JERSEY, ASSIGNOR TO HIMSELF AND MARCUS HANAN.

IMPROVEMENT IN HOLLOW HAND-CUTTERS FOR LEATHER.

Specification forming part of Letters Patent No. 147,047, dated February 3, 1874; reissue No. 6,857, dated January 18, 1876; application filed October 29, 1875.

*To all whom it may concern:*

Be it known that ABEDNEGO DEWES, of Hudson City, in the county of Hudson and State of New Jersey, has invented a certain Improvement in Hand Cutters or Dies for Cutting Leather, Textile Fabrics, &c., of which the following is a specification:

The invention relates to hollow cutters or dies for cutting out various-shaped pieces from sheets of leather, textile fabrics, &c., which are secured to a handle, by which they are manipulated; and it consists in so constructing the handle and devices whereby it is attached to the cutter that cutters of varying sizes may be attached thereunto, readily attached without alteration of the handle or adaptation of the cutter thereto, while at the same time the handle will have firm and solid bearings on the cutter, so as to properly and effectively transmit the impact of the hammer or mallet used in operating the cutter.

The advantages of this improvement are obvious and require but brief exposition herein: first, it saves the handle when the cutter becomes useless; and, secondly, it enables one handle to serve several cutters by its being transferred from one to another, and thus the expense of a handle for every cutter is avoided.

Figure 1:
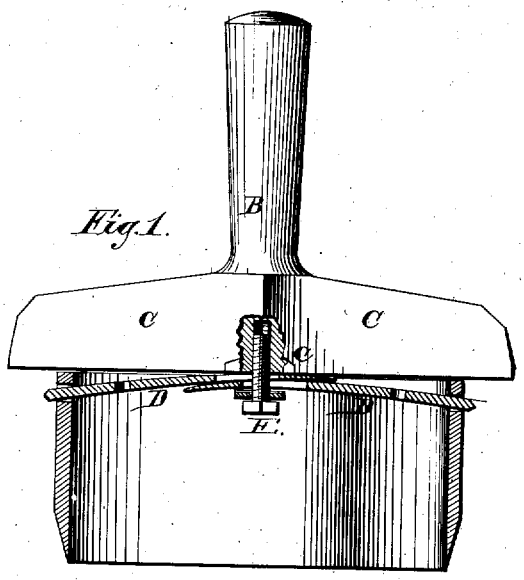
Figure 2:
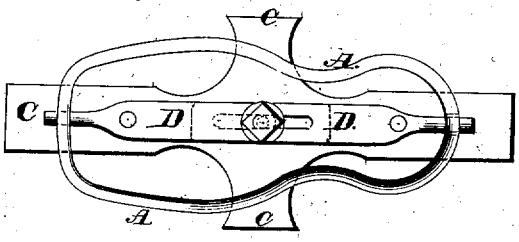
Figure 3:
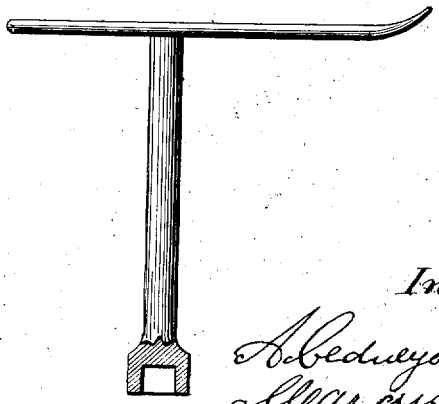

Figure 1 is a longitudinal elevation, partly in section. Fig. 2 is a sub-view of Fig. 1. Fig. 3 is a side elevation of a wrench to be used in fastening the devices, which are represented in this example for securing the handle to the cutter.

A represents the cutter, which is in the ordinary form, and, without the handle, is like those used for cutting in a press by power. B is the handle, which, in this example, has four stout arms, C, branching horizontally from the lower end, to extend over and project beyond the top of the cutter in its long and short axes. D represents a couple of strong spring bars or bolts for fastening the handle to the cutter. They are slotted at one end, and meet together at the clamping-bolt E, which passes through the slots and screws into the center of the bottom of the handle, while the other ends slide out through holes *a* in the ends of the cutter.

It will be obvious that various modifications in the manner of attaching the handle to the cutter may be made—*e. g.*, hook-bolts may be inserted in the holes in the cutter, and passed through holes in the handle, and the latter and the cutter clamped together by nuts on the hook-bolts.

By having the devices for securing the handle to the cutter adjustable and removable, or, in other words, not rigidly formed on each, we are enabled to employ the handle on various-sized cutters.

The arms of the handle being properly made and the back of the cutter even, a perfect bearing between the two will be secured by either of the fastenings described.

In operating the fastening devices shown in the drawing, the bolt-screw E is loosened sufficiently to allow the springs D to be moved in or out, and inserted in the holes in the cutter or withdrawn therefrom.

What is claimed as the invention of ABEDNEGO DEWES is—

1. In combination, the cutter A, the detachable or removable handle B, provided with bearing-arms C C, and detachable or adjustable devices D E, for securing the cutter to the handle, substantially in the manner described and specified.

2. The handle B, provided with the adjustable or removable devices, whereby it can be attached to cutters of various sizes, substantially as described and specified.

3. In combination with the cutter A, the detachable handle B, provided with arms C, secured by means of a screw-bolt, E, to the movable slotted springs D D, constructed and operating substantially in the manner described and specified.

ABEDNEGO DEWES.
MARCUS HANAN.

Witnesses:
FRANK C. RUMERY,
CLARENCE C. HUNTING.